(12) United States Patent
Potter

(10) Patent No.: US 7,980,335 B2
(45) Date of Patent: Jul. 19, 2011

(54) OMNI-DIRECTIONAL WHEEL

(75) Inventor: Steven D. Potter, Bedford, MA (US)

(73) Assignee: Foster-Miller, Inc., Waltham, MA (US)

( * ) Notice: Subject to any disclaimer, the term of this patent is extended or adjusted under 35 U.S.C. 154(b) by 269 days.

(21) Appl. No.: 12/321,903

(22) Filed: Jan. 26, 2009

(65) Prior Publication Data
US 2010/0187779 A1   Jul. 29, 2010

(51) Int. Cl.
- B60B 19/12 (2006.01)
- B60G 17/00 (2006.01)

(52) U.S. Cl. ........ 180/7.1; 180/7.2; 301/5.23; 280/6.15; 280/6.157; 280/5.507

(58) Field of Classification Search .......... 180/7.1, 180/7.2; 280/28.5; 301/5.23
See application file for complete search history.

(56) References Cited

U.S. PATENT DOCUMENTS

| | | | | |
|---|---|---|---|---|
| 3,253,632 A * | 5/1966 | Dalrymple | | 152/15 |
| 3,363,735 A * | 1/1968 | Hotchkiss | | 193/37 |
| 3,465,843 A | 9/1969 | Guinot | | |
| 3,590,970 A * | 7/1971 | Kornylak | | 193/37 |
| 3,621,961 A * | 11/1971 | Stumpf | | 193/37 |
| 3,789,947 A | 2/1974 | Blumrich | | |
| 3,876,255 A | 4/1975 | Ilon | | |
| 3,882,885 A * | 5/1975 | McCain | | 137/899.1 |
| 4,223,753 A | 9/1980 | Bradbury | | |
| 4,715,460 A | 12/1987 | Smith | | |
| D294,074 S * | 2/1988 | Sogge | | D34/29 |
| 4,907,692 A | 3/1990 | Sogge | | |
| 5,213,176 A * | 5/1993 | Oroku et al. | | 180/168 |
| 5,323,867 A * | 6/1994 | Griffin et al. | | 180/22 |
| 5,374,879 A | 12/1994 | Pin et al. | | |
| 6,315,109 B1 * | 11/2001 | Dean | | 198/786 |
| 6,340,065 B1 | 1/2002 | Harris | | |
| 6,394,203 B1 | 5/2002 | Harris | | |
| 6,547,340 B2 | 4/2003 | Harris | | |
| 6,857,707 B2 | 2/2005 | Guile | | |
| 7,431,148 B2 * | 10/2008 | Li et al. | | 198/786 |
| 7,621,355 B2 * | 11/2009 | Chu et al. | | 180/7.2 |
| 7,641,288 B1 * | 1/2010 | Baker et al. | | 301/5.23 |

* cited by examiner

*Primary Examiner* — Tony H. Winner
*Assistant Examiner* — Wesley Potter
(74) *Attorney, Agent, or Firm* — Iandiorio Teska & Coleman

(57) ABSTRACT

An omni-directional wheel includes a hub rotatable about a wheel axis and a first row of angled rollers about the hub each rotatably supported by the hub. There is at least a second row of angled rollers about the hub each also rotatably supported by the hub. The rollers of the second row are axially offset along the wheel axis from the first row, and rotationally offset from the first row about the wheel axis, and not coaxial with the rollers of the first row.

25 Claims, 14 Drawing Sheets

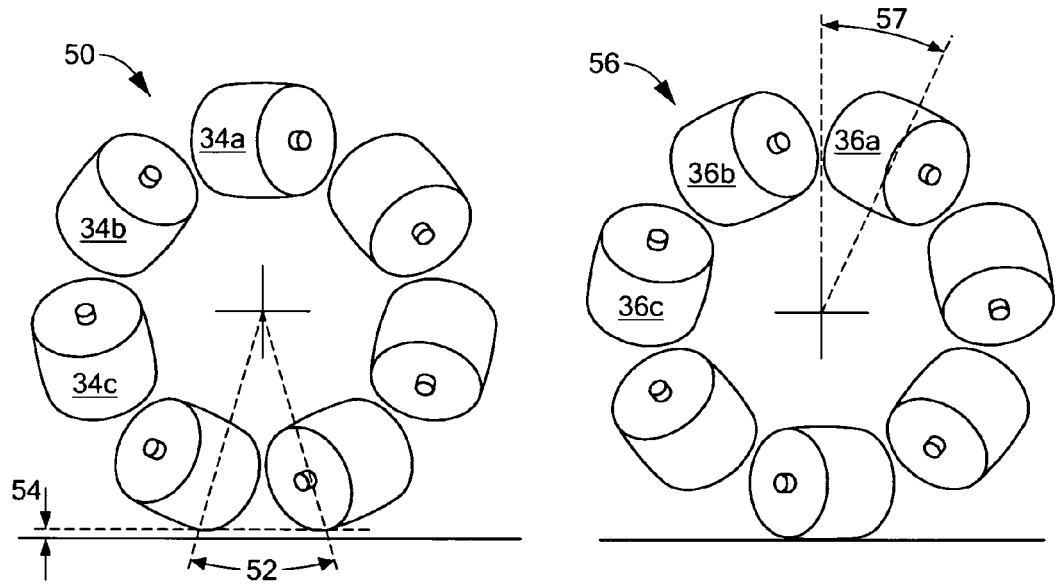
FIG. 5A  FIG. 5B
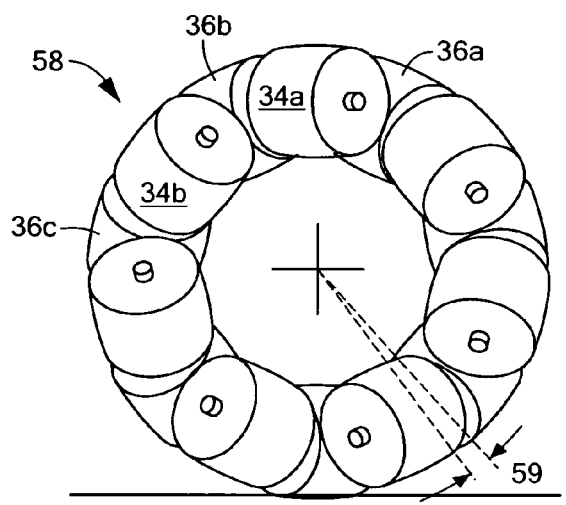
FIG. 5C

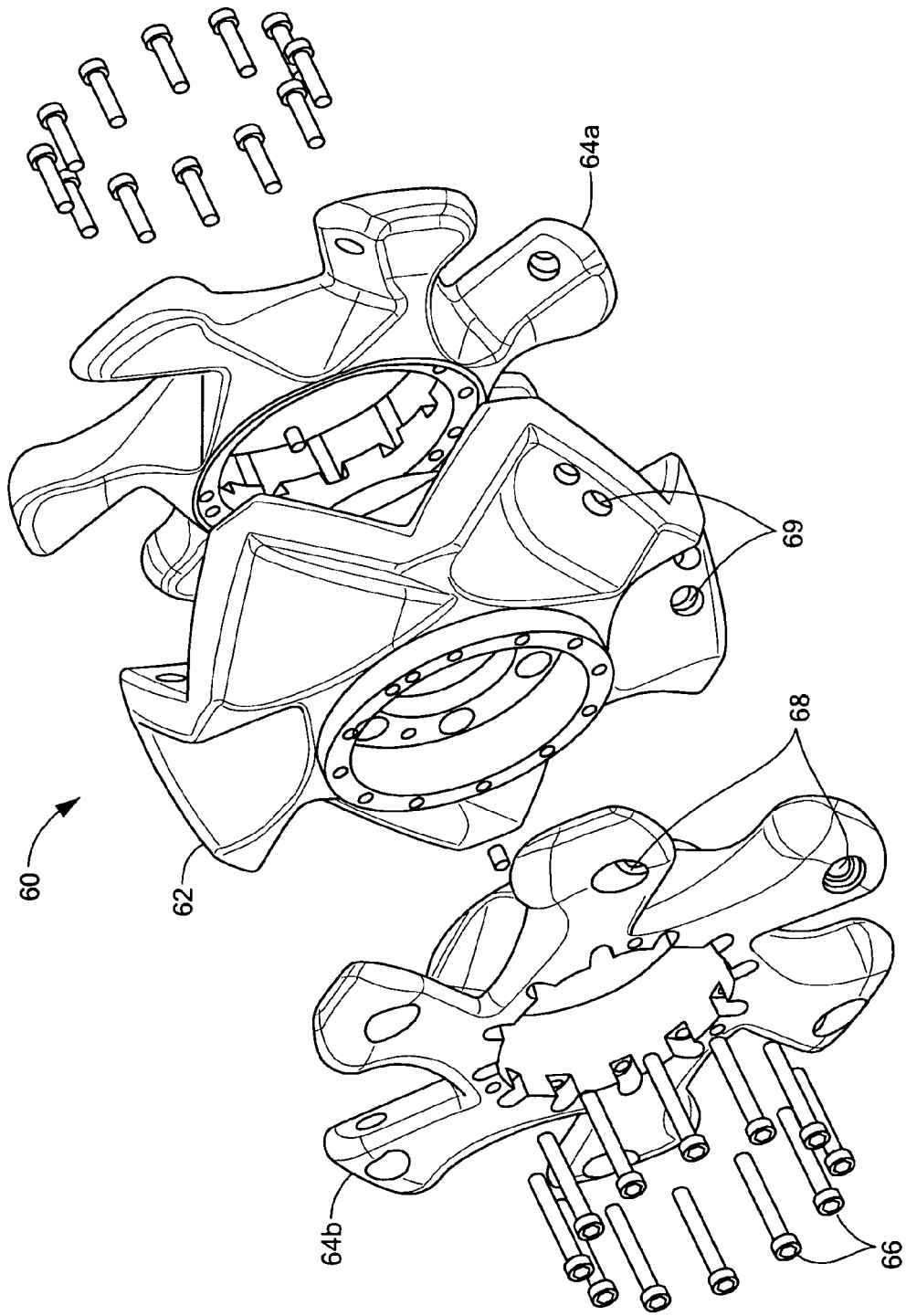

OMNI-DIRECTIONAL WHEEL

GOVERNMENT RIGHTS

Certain aspects of this invention were made with U.S. Government support under Contract No. N68335-03-D-0101 by the US Navy. The Government may have certain rights in the subject invention.

FIELD OF THE INVENTION

The subject invention relates to omni-directional wheels and vehicles.

BACKGROUND OF THE INVENTION

A wheel that is capable of sideways movement is shown in U.S. Pat. Nos. 3,876,255 and 6,547,340 both incorporated herein by this reference. Other prior art regarding "omni-directional" wheels includes U.S. Pat. Nos. 6,857,707; 4,223,753; 6,340,065; 4,907,692; 6,394,203; 6,857,707; 4,715,460; 5,374,879; and 3,465,843. These references are also incorporated herein by this reference.

As shown in U.S. Pat. No. 6,547,340, a typical omni-directional wheel includes a hub rotatably mounted to an axle. A number of rollers are mounted to the hub via mounting brackets and the rollers are set at different angles so that as the hub rotates, each roller, when in contact with the ground, is at the same angle relative to the axle (e.g., 45°). A vehicle equipped with such wheels can move forward and backward, sideways, rotate, or any combination thereof, by controlling the rotational speeds of the wheels.

There are several problems associated with typical omni-directional wheels of the prior art. For example, the rollers are typically tapered on one or both ends. The taper causes a variation in the roller's radius within the contact patch. The resultant scrubbing causes increased rolling friction and wear. Small tapered rollers also limit the load carrying capacity of the wheel. If the size of the rollers is increased, then the wheel itself must also be made larger to support the larger rollers. In some implementations, however, a larger wheel cannot be accommodated. Prior art omni-directional wheels also have a limited capacity to traverse obstacles when the wheel travels sideways.

BRIEF SUMMARY OF THE INVENTION

It is therefore an object of this invention to provide a new omni-directional wheel.

It is a further object of this invention to provide such an omni-directional wheel which is not as prone to scrubbing and wear.

It is a further object of this invention to provide such a wheel with a higher load capacity for a given wheel diameter or overall size.

It is a further object of this invention to provide a stable, smooth riding omni-directional vehicle.

It is a further object of this invention to provide a low-profile omni-directional vehicle that can drive under a payload which is supported on legs, and can lift and maneuver the payload.

It is a further object of the invention to provide an omni-directional vehicle that can control pitch and roll of its chassis.

It is a further object of the invention to provide an omni-directional vehicle that can negotiate obstacles.

The subject invention results from the realization that, in one example, a smaller omni-directional wheel still able to support large loads includes at least two rows of rollers typically nearly cylindrical in shape providing a smooth rolling action with less scrubbing and wear.

The subject invention features an omni-directional wheel comprising a hub rotatable about a wheel axis, a first row of rollers about the hub each rotatably supported by the hub, and at least a second row of rollers about the hub each rotatably supported by the hub. The second row of rollers are axially offset along the wheel axis from the first row, rotationally offset from the first row about the wheel axis, and not coaxial with the rollers of the first row. The rollers are angled such that their axes are not parallel to the plane of the wheel. Typically, all rollers will have a common "roller angle" defined as the angle between a plane perpendicular to a roller's axis and a plane perpendicular to the wheel axis.

For 4-wheel vehicles having parallel wheel axes, the preferred roller angle is close to 45°, i.e. between 35°-55°. Using other wheel layouts, a roller angle less than 35° can improve load capacity or allow the use of a smaller, lower-profile wheel.

In one preferred embodiment, there are r rows and n rollers per row and the rotational offset is $360/(n \times r)$ degrees. Typical values for n are between 3 and 7, and typical values for r are 2 to 4. The rollers of one row typically do not form a round wheel, but the rollers of additional rows fill in the angular gaps between rollers of the first row resulting in a substantially round wheel.

The rollers can be supported on one or both ends, and the hub can be made from one piece or can be an assembly of multiple pieces. In one example, the hub includes a center rim sandwiched by and attached to an inner flange and an outer flange. The rollers of the first row are mounted between the center rim and the inner flange and the rollers of the second row are mounted between the center rim and the outer flange. In another example, the rollers are cantilevered off opposite ends of a hub having a zig-zag center rib.

To minimize wheel width, the rollers of one row are preferably nested with the rollers of an adjacent row such that the rollers of both rows intersect a common plane orthogonal to the wheel axis. In general, it is desirable that the ends of each roller are substantially equal diameter.

For higher load capacity, and/or improved ability to traverse holes or dents in the ground, the wheel can have redundant rows of rollers, thus providing more than one roller in contact with the ground.

The subject invention also features an omni-directional vehicle having at least three omni-directional wheels each comprising a hub rotatable about a wheel axis, a first row of rollers about the hub each rotatably supported by the hub, and at least a second row of rollers about the hub each rotatably supported by the hub. The second row of rollers is axially offset along the wheel axis from the first row and rotationally offset from the first row about the wheel axis. The rollers of the second row are not coaxial with the rollers of the first row. The rollers of both rows also have a substantially common roller angle defined as the angle between a plane perpendicular to a roller's axis and a plane perpendicular to the wheel axis. The roller angle is not 90°.

The vehicle may include four omni-directional wheels. The wheels can be oriented in the conventional way, with the wheel axes perpendicular to the long axis of an elongated vehicle, but for better stability and traction, the preferred orientation is for the wheel axes to be parallel to the long axis of the vehicle. This is especially true if the wheels are wide compared with their diameter. In general, if the four wheel axes are parallel, the preferred roller angle is in the range 35° to 55°. Two diagonally opposed wheels should be right-handed, and the other two wheels left-handed.

The subject invention also features a wheel layout which is especially appropriate for omni wheels having a small roller angle, i.e. less than 40°. In this example, all four wheels have the same handedness, the wheel axes of diagonal opposing wheels are parallel to within 15°, and the wheel axes of adjacent wheels are perpendicular to within 15°.

Use of a suspension system is desirable, especially in the case of a 4-wheel omni-vehicle since this equalizes the load on the wheels and avoids rocking on diagonal opposed wheels. The invention features a particularly advantageous suspension wherein each wheel is allowed to move vertically with respect to the vehicle chassis. This keeps the wheel axes approximately parallel to the ground which minimizes vibration due to ride height variation.

The suspension can be actively controlled to raise and lower the chassis. This provides the ability to drive under a payload (supported on legs). The payload can then be lifted, transported and set back down. The active suspension can also be used to reduce the load on one pair of diagonally opposed omni-wheels, while increasing the load on the other pair of diagonally opposed wheels. This allows the vehicle to more easily climb a step or drive over an obstacle such as a cable or chain. The active suspension can also control the pitch and roll of the chassis relative to the ground or other driving surface.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 5A-5C schematically show the two rows of rollers of the omni-directional wheel of FIG. 3 separate (FIGS. 5A and 5B) and then combined (FIG. 5C);

FIG. 6 is a schematic three-dimensional exploded view showing one hub design for an omni-directional wheel in accordance with the subject invention;

DETAILED DESCRIPTION OF THE INVENTION

Figure 1:
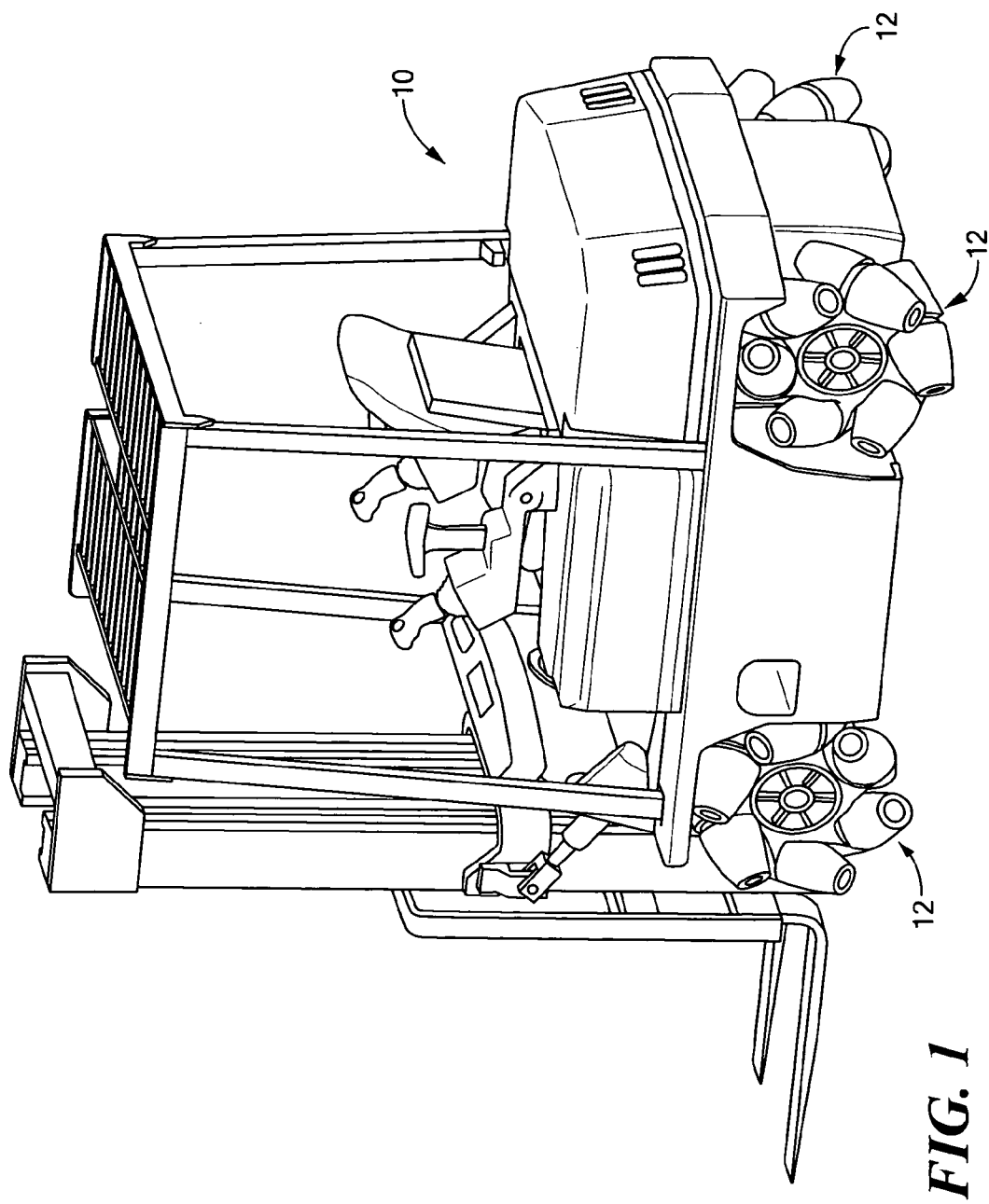
FIG. 1 is a schematic three-dimensional view showing a vehicle with prior art omni-directional wheels of U.S. Pat. No. 6,547,340.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows forklift 10 with omni-directional wheels 12 in accordance with U.S. Pat. No. 6,547,340. Each omni-directional wheel 12, FIG. 2 includes hub 14 mounted to axle 16. Hub 14 has seven mounting tabs, of which only 20a-20c are visible. Each mounting tab supports a pair of tapered rollers. For example, tab 20a supports rollers 22a and 24a; tab 20b supports rollers 22b and 24b; and tab 20c supports rollers 22c and 24c. While there are in fact 14 rollers, the wheel is functionally equivalent to a 7-roller design since the rollers in each pair are coaxial. Wheel 12 is, in effect, a conventional "single row" mecanum wheel since there is a single rotational array of roller axes. Problems associated with such prior art omni-directional wheels as noted above in the Background section include excessive scrubbing and wear and poor load capacity relative to the size of the wheel.

Figure 3:
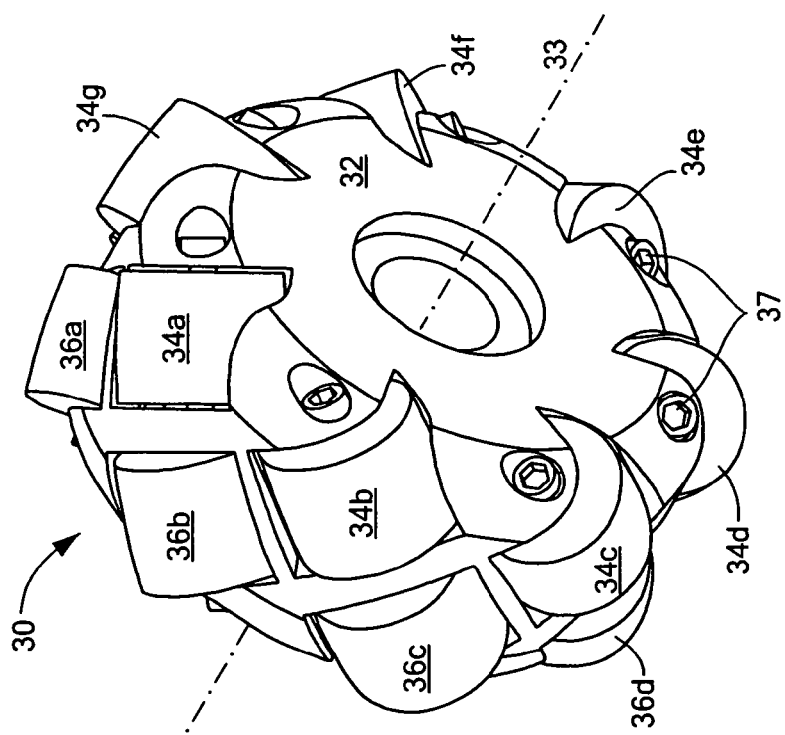
FIG. 3 is a schematic three-dimensional view showing an example of a new omni-directional wheel in accordance with the subject invention.

One new omni-directional wheel 30, FIG. 3 in accordance with an example of the subject invention includes hub 32 rotatable about wheel axis 33. In this particular example, there are two rows of angled rollers each supported by hub 32. The first row includes rollers 34a-34g. The second row includes, in this example, the same number of rollers but only rollers 36a-36d can be clearly seen in the Figure. The rollers in the second row are axially offset along wheel axis 33 from the rollers of the first row. Also, the rollers of the second row are rotatably offset from the rollers of the first row about the wheel axis. The rollers in the two rows (e.g., rollers 36c and 34b) are not coaxial.

In this way, as hub 32 rotates (it is typically driven by an axle, not shown), roller 36d of the second row will be on the ground, then roller 34c of the first row, then roller 36c of the second row, then roller 34b of the first row, then roller 36b of the second row, and so on. If there are r rows and n rollers per row, the rotational offset between the rollers such as roller 36c and 34b is $$360/(n \times r) \quad (1)$$

In this example, there are 2 rows and 7 rollers per row, and the rotational offset is 25.71°.

Figure 4:
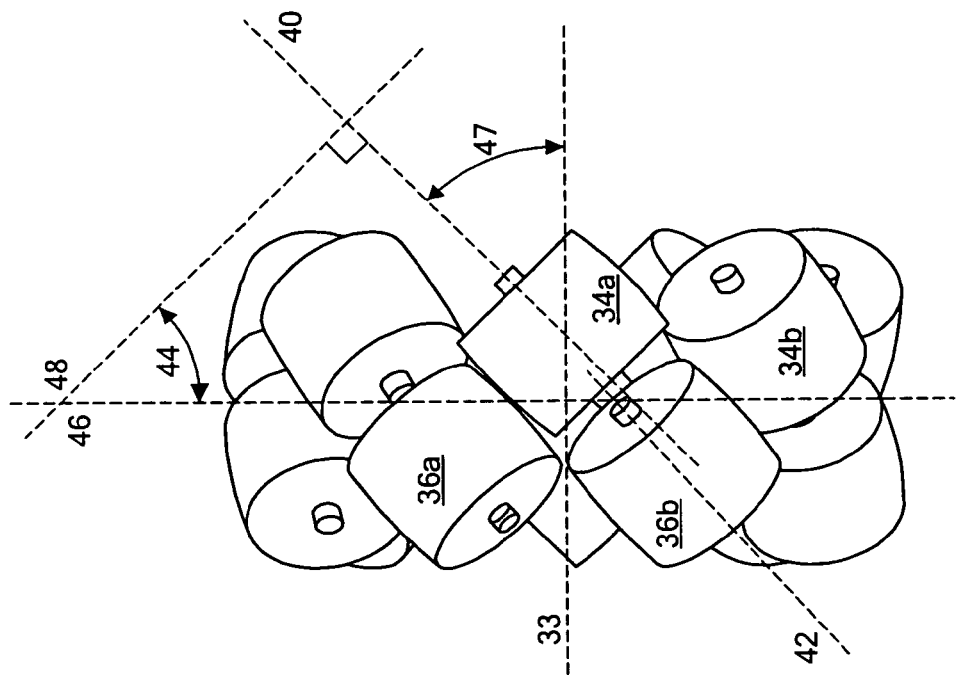
FIG. 4 is a top view showing the orientation of the rollers of the omni-directional wheel of FIG. 3.

FIG. 4 shows a top view of the omni-directional wheel of FIG. 3 with the wheel hub removed. Note that roller axis 40 of roller 34a is not coaxial with axis 42 of roller 36b, nor are any other rollers of the first row coaxial with those in the second row. Typically, in accordance with the invention, the rollers will have a consistent "roller angle" defined as the angle between a plane perpendicular to the wheel axis and a plane perpendicular to a roller's axis. For instance, plane 46 is perpendicular to the wheel axis 33, plane 48 is perpendicular to roller axis 40 of roller 34a, and the "roller angle" 44 is the angle between these two planes. In this example, the roller angle is 45°. An equivalent definition of roller angle is the angle between the roller axis and the wheel axis when viewed such that both axes are parallel to the view plane. For instance, the angle 47 between roller axis 40 and wheel axis 33 is equivalent to the roller angle 44.

In accordance with the invention, the rows of rollers may be nested closely together to maximize load capacity and minimize wheel size. For example, in FIG. 4, roller 34a of the first row and roller 36b of the second row both intersect plane 46, and are therefore considered to be "nested".

As shown in FIG. 5, the rollers of one row have large angular gaps which result in large variations in the wheel radius. For example, large angular gap 52 of row 50 results in radius variation 54. One row alone would result in a very bumpy ride, but when combined with one or more additional rows, the rollers form a substantially complete circle, with minimal ride-height variation. For instance, row 50 combined with row 56 (clocked at angle 57, equal to 25.71°), results in the complete roller set 58 having very small angular gaps 59. Note that roller 36b of the second row "fills the gap" between rollers 34a and 34b of the first row.

The use of multiple rows of non-coaxial rollers, in accordance with the invention, allows the use of larger diameter rollers with less taper. The result is as greater load capacity, reduced wheel wear, lower rolling friction, reduced contact pressure, greater positioning accuracy, less vibration, and an improved ability to travel sideways over obstacles. By making the ends of the rollers larger, there is more room for bearings and the ability to support each roller on both ends.

Hub 32, FIG. 3 may be made of one piece of material, e.g. by casting from aluminum alloy and then CNC machining. Hub 32 supports each roller axle from both ends. For easy replacement, each roller can be mounted on bearings to a tubular axle. The resulting "cartridge assemblies" can be inserted into the roller pockets and secured with axle bolts 37.

The hub may also be an assembly of multiple parts. FIG. 6 shows an exploded view of a three piece hub for an omni wheel, in accordance with the invention, having 2 rows of 6 rollers. Hub 60 includes center rim 62 sandwiched by inner flange 64a and outer flange 64b. The flanges attach to either side of the center rim using fasteners 66. Rollers are mounted by inserting axle bolts into through holes 68 and screwing into threaded holes 69. Holes 68 and 69 can be counterbored to accept "shoulder screw" type axle bolts.

Figure 7:
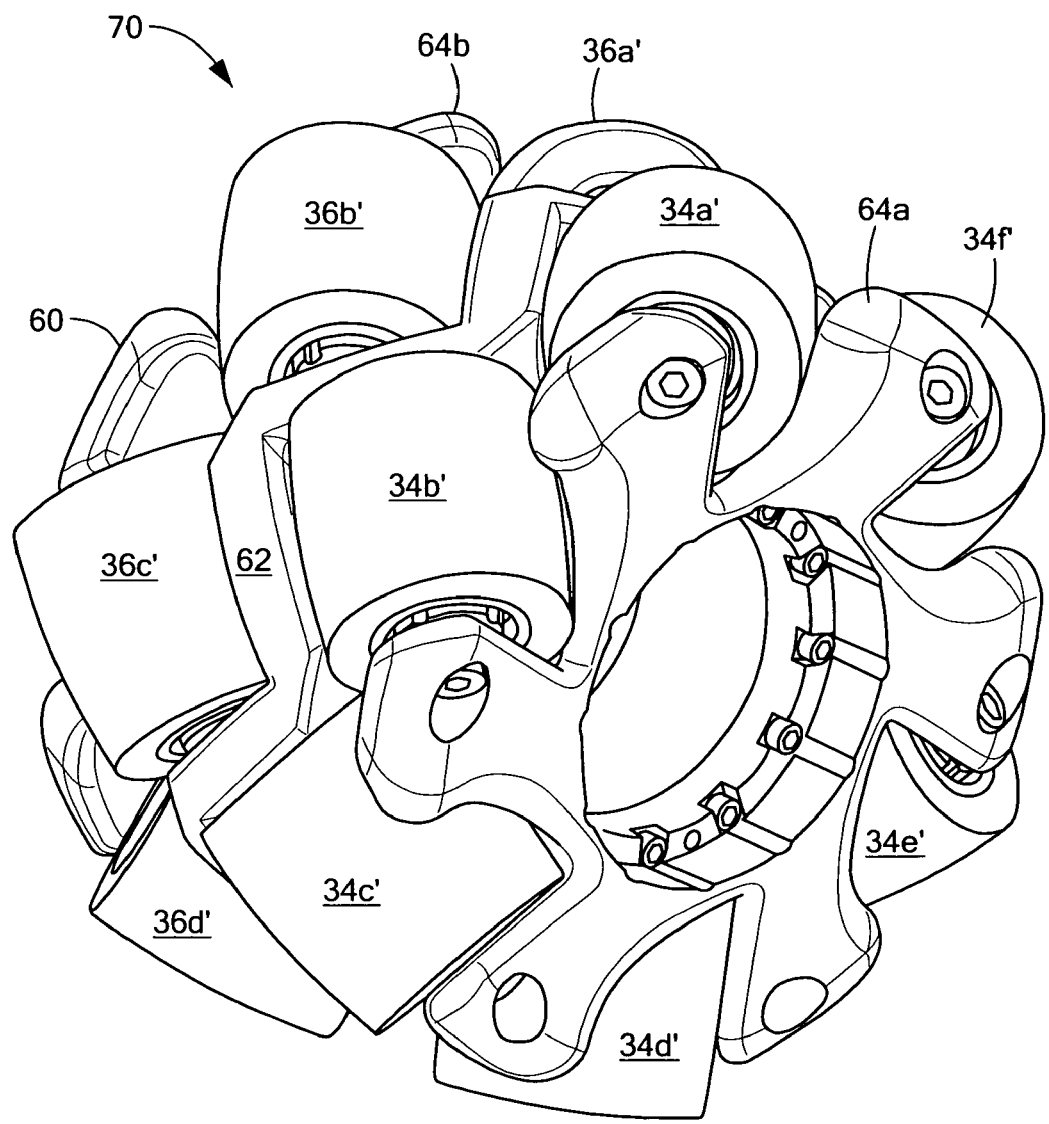
FIG. 7 is a schematic three-dimensional view showing the hub of FIG. 6 assembled with 12 rollers rotatably attached thereto in accordance with the subject invention.

FIG. 7 shows hub 60 assembled and populated with rollers resulting in omni wheel 70. All rollers are supported at both ends for maximum load capacity. Rollers of the first row (34a'-34f') mount between the inner flange 64a and center rim 62, and rollers of the second row (36a'-36d') mount between center rim 62 and outer flange 64b.

Omni-wheel 70 was built and tested. It exhibited an 8 times reduction in wear rate compared with a similarly sized mecanum wheel of the type shown in FIGS. 1 and 2 (prior art). The current invention achieves lower wear rate by having less variation in the roller radius within the contact patch, i.e. the rollers are nearly cylindrical in shape and therefore scrub much less than the near-conical rollers of the prior art. The load capacity is also improved owing to the increase in the minor diameter of the rollers. The minor diameter of the preferred rollers of the subject invention is approximately two times larger than a prior art design built by Airtrax Inc., having comparable wheel diameter.

Figure 8:
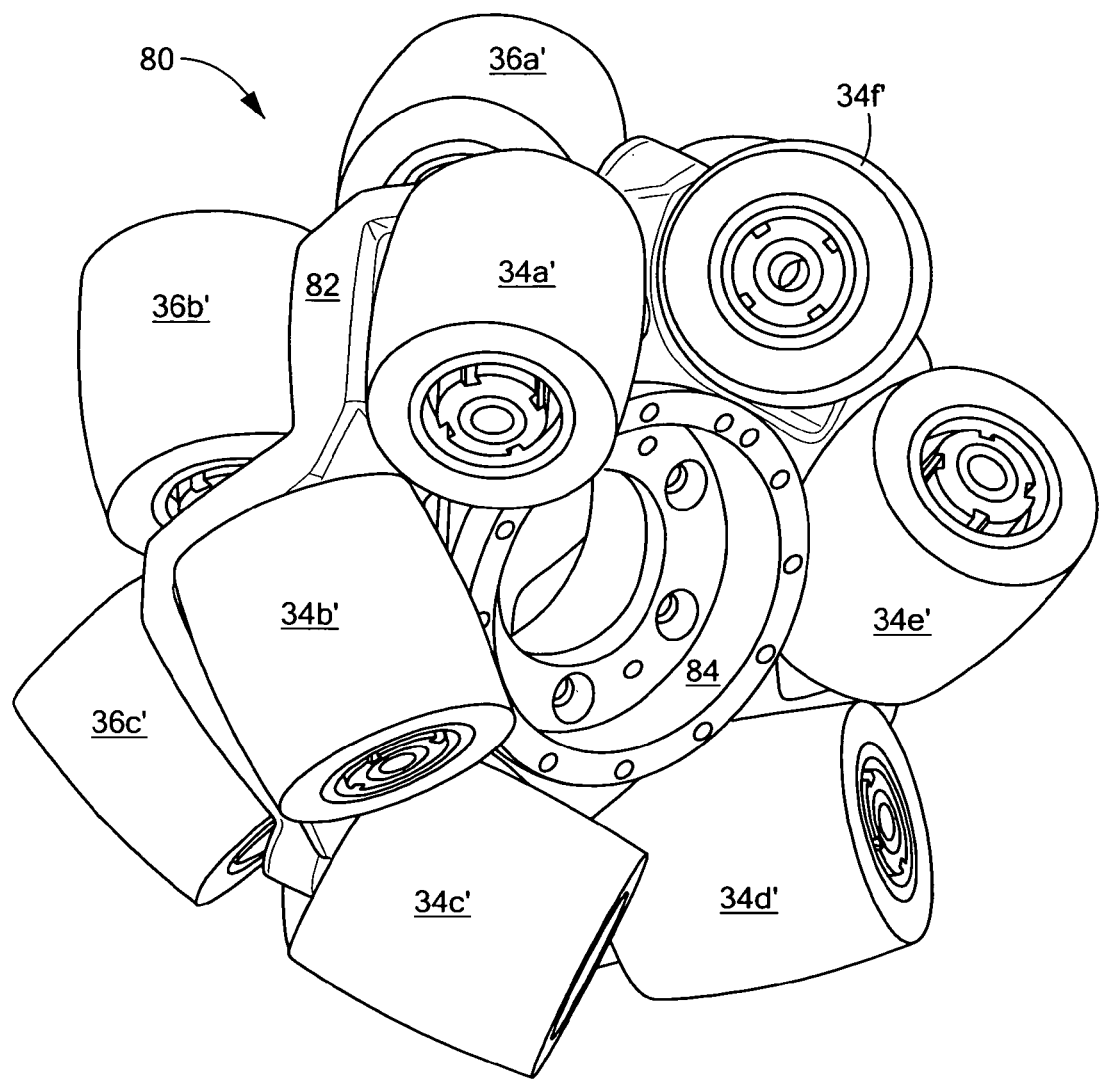
FIG. 8 is a schematic three-dimensional view showing an example of an omni-directional wheel with cantilever rollers.

To reduce manufacturing cost, the hub may support the rollers from one end, as shown in FIG. 8. In this example, omni wheel 80 uses the same roller layout as omni-wheel 70 FIG. 7, but does not use flanges 64a and 64b. Instead, the roller axles are cantilevered off zig-zag center rib 82 of wheel hub 84. Wheel hub 84 is similar to center rim 62 FIG. 6, but may include additional reinforcement to support the roller axles. This hub design is amenable to high-volume production since it can be cast in one piece without the use of cores. The zig-zag center rib is inherently strong and stiff, providing higher load capacity than mounting tabs such as 20b FIG. 2 (prior art).

Figure 9:
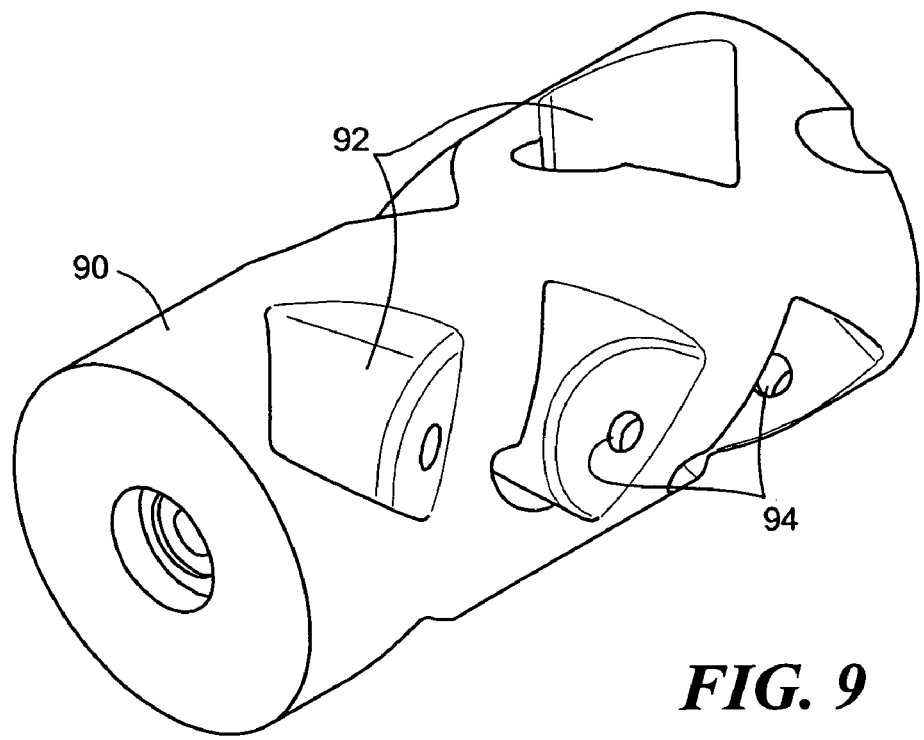
FIG. 9 is a schematic three-dimensional front view of a wheel hub for a low-profile, high load capacity omni directional wheel, in accordance with the subject invention.
Figure 10:
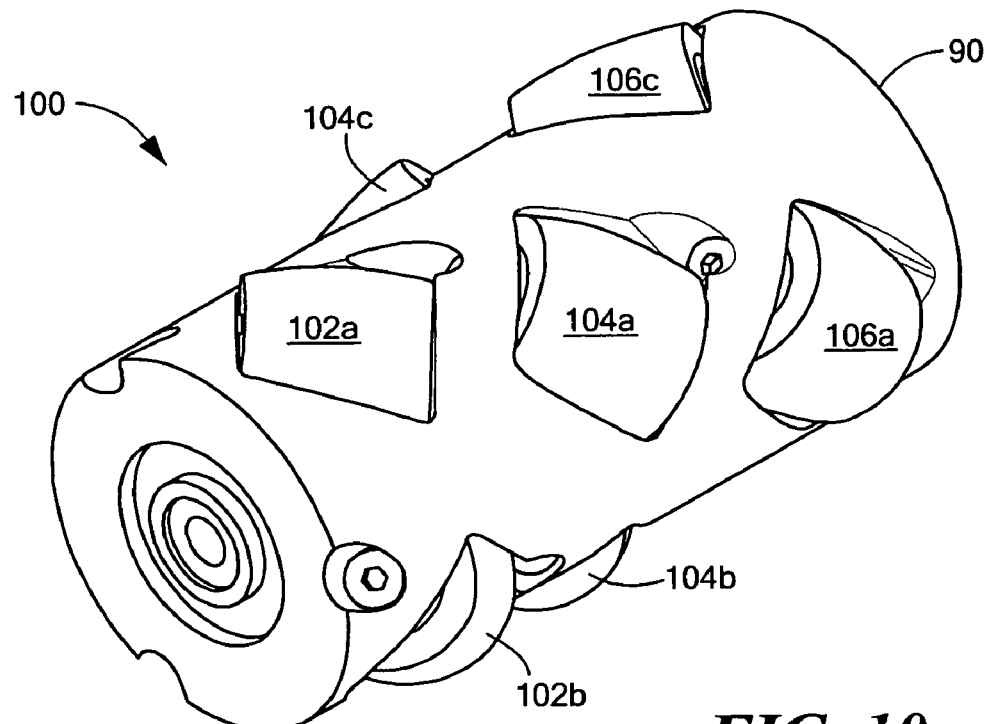
FIG. 10 is a schematic three-dimensional front view of the wheel hub of FIG. 9, with rollers and axles installed.

FIGS. 9 and 10 show an example of a low profile, high-capacity omni wheel having 3 rows of 3 rollers with roller angle 45 degrees. FIG. 9 shows wheel hub 90 with roller pockets 92 and roller axle holes 94. Opposite the axle holes are threaded holes (not visible). FIG. 10 shows hub 90 populated with 9 rollers, resulting in omni wheel 100. Rollers 102a and 102b are in the first row, rollers 104a-c in the second row and rollers 106a and 106b in the third row. The other two rollers for the first and third rows are not shown. Omni wheel 100 may be scaled large or small as needed to meet a desired load capacity. In one specific example, the wheel is 7" diameter by 12.5" wide, and the rollers are 3" diameter×2.7" wide. The load capacity is approximately 700 lb assuming the tread deflects 4% of the minimum roller radius and the average pressure in the contact patch is 750 psi. This level of tread deflection and contact pressure is reasonable using polyurethane tread material.

In general, load capacity is dependent primarily on the minimum roller diameter as opposed to the wheel diameter, since at some point the full wheel load is typically carried by one roller. To increase roller diameter, the most effective method is to reduce the number of rollers per row and increase the number of rows. This tends to increase the wheel width. Increasing the wheel diameter has only a small effect on roller diameter. Typically a larger diameter wheel requires more rollers, but the roller diameter is about the same.

Figure 11:
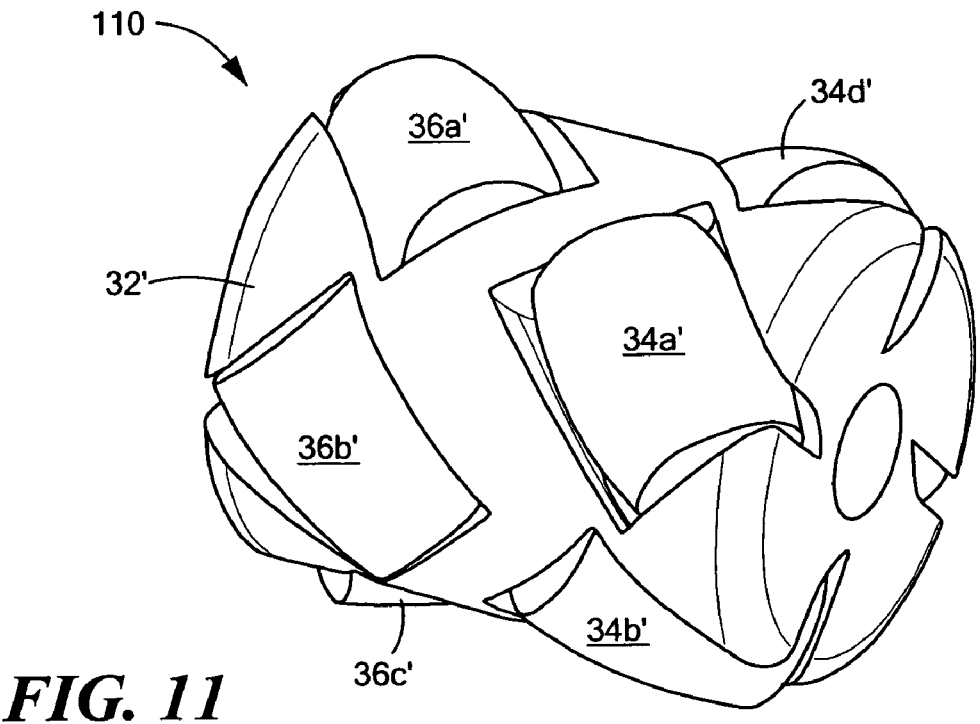
FIG. 11 is a schematic three-dimensional front view of another low-profile omni-directional wheel.

FIG. 11 shows another example of a compact, high capacity omni wheel. Omni wheel 110 includes hub 32' supporting 2 rows of 4 rollers. The roller angle is 45°. Roller 34a' is in the first row and 36a' in the second row. In one example, the wheel is 8.51" diameter×9.25" wide, has rollers 3.18" diameter×3.86" wide, and has a load capacity of 750 lb.

Figure 12:
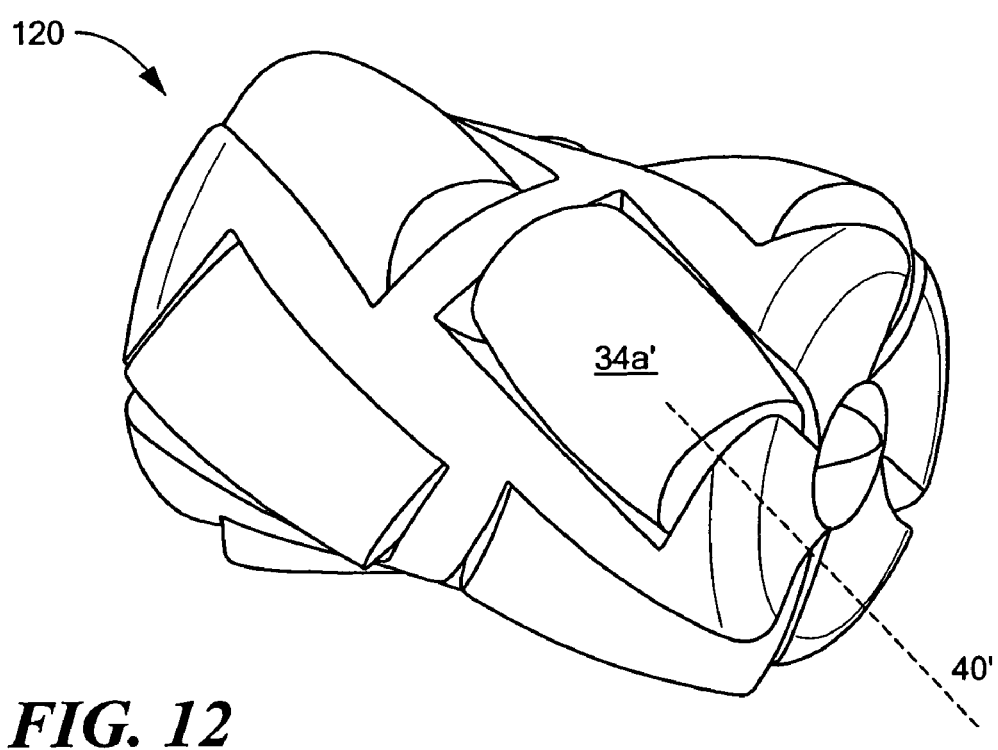
FIG. 12 is a schematic three-dimensional front view of a low-profile omni-directional wheel having reduced roller angle.

Omni-wheel 120, FIG. 12 also has 2 rows of 4 rollers, but the roller angle in this case is 30°. This tends to increase the length of the contact patch and provides higher load capacity and/or allows the wheel to be made smaller. In one example, the wheel is 7" diameter×9.2" wide, has rollers 2.73" diameter×4.0" wide and has load capacity 750 lb. By reducing the roller angle from 45° to 30° as shown at 40', the wheel volume is reduced by 33% without increasing the contact pressure.

Figure 13:
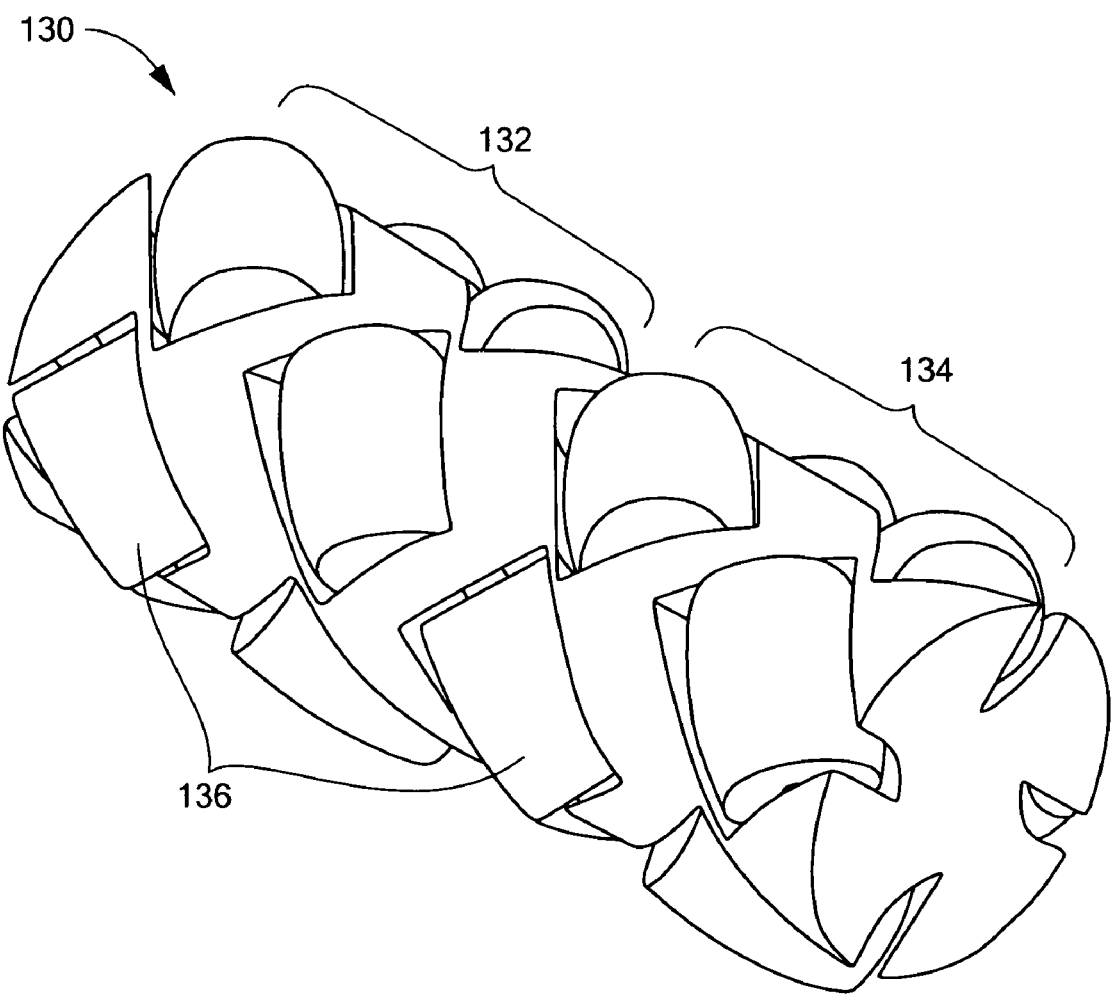
FIG. 13 is a schematic three-dimensional front view of an omni-directional wheel having redundant rollers.

FIG. 13 shows an omni wheel with redundant rows of rollers 136 providing additional load capacity and the ability to traverse dents or holes more smoothly. In this example, omni wheel 130 has 4 rows of 4 rollers 136, but each row is clocked by 45° instead of by 360/(n×r)=22.5°. On flat ground, there will be a minimum of two rollers in contact with the ground at all times. In effect, wheel 130 is like two omni wheels 110, FIG. 11 mounted end-to-end and nested. In FIG. 13, the back half 132 of wheel 130 provides at least one roller-contact, and the front half 134 provides a second contact. This should not be considered limiting, however since the rows of rollers could be rearranged in any order along the wheel axis.

Omni wheel 100, FIG. 10 is an example of a left-handed wheel. "Handed-ness" of an omni wheel is most easily determined by imagining the wheel acting inside a close-fitting pipe. A right-handed wheel, when driven clockwise will "screw" into the pipe and a left-handed wheel will "screw" out. Omni wheel 30, FIG. 3 is an example of a right-handed wheel. A typical 4-wheel omni-vehicle layout, such as that in FIG. 1 (prior art) uses right-handed wheels on the front/right and back/left corners of the vehicle, and left-handed wheels on the front/left and back/right.

Figure 2:
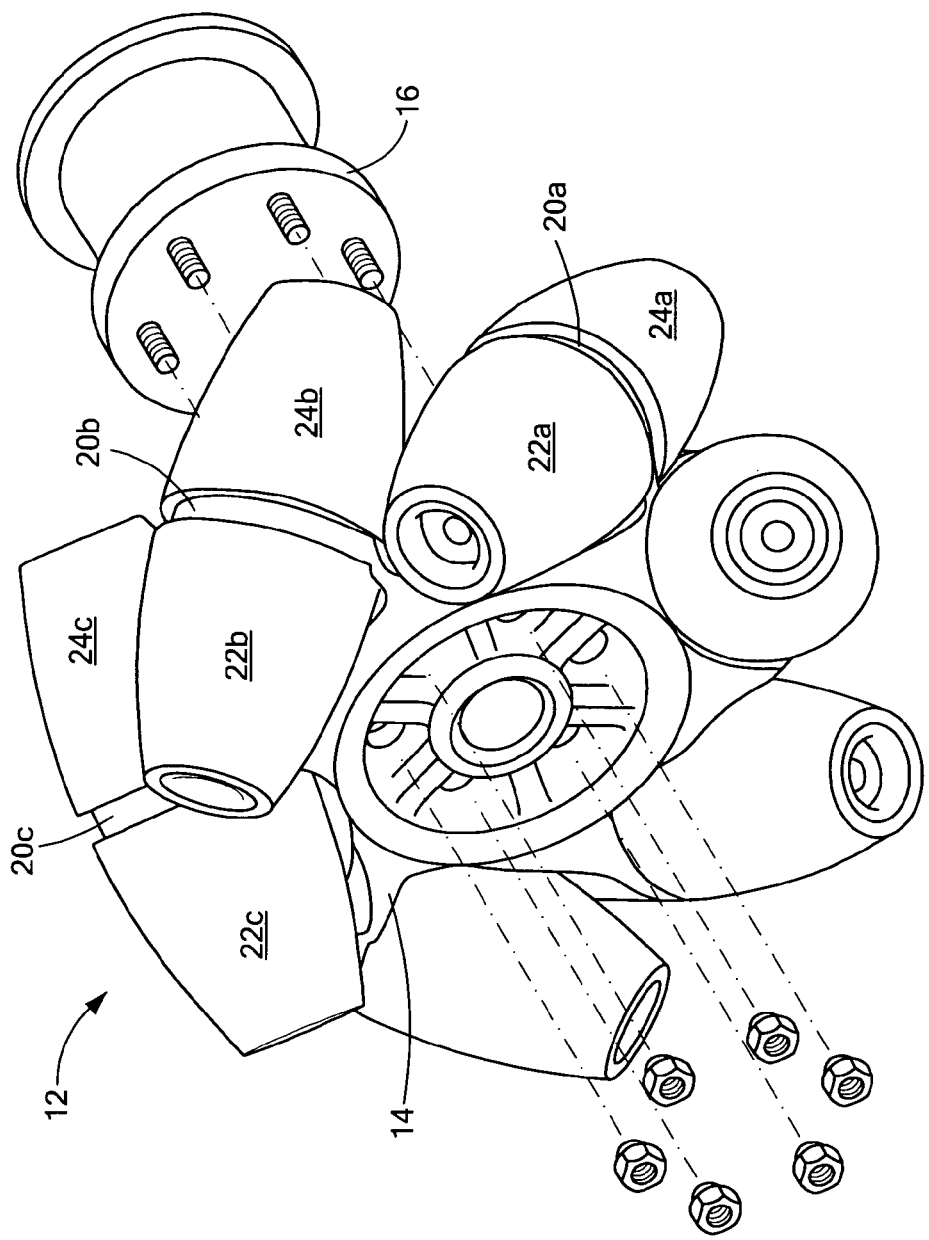
FIG. 2 is a schematic three-dimensional partially exploded view showing the prior art omni-directional wheel of U.S. Pat. No. 6,547,340.

Whether using omni-wheels in accordance with the invention, or prior art wheels such as wheel 12, FIG. 2, a minimum of three wheels is needed to support a vehicle and to control X (fore/aft), Y (lateral) and yaw (Z-rotation) motion. Use of 3 wheels can be advantageous since the vehicle need not have a suspension. If a vehicle uses 4 omni-wheels, a suspension is typically needed to avoid teetering on a diagonally opposed wheels, as can happen due to very slight variations in flatness of the ground. If only two wheels are under load, there will be a direction in which the vehicle can freely roll, even if the wheels do not turn. This may be acceptable for applications on flat ground, but would not be acceptable on sloping ground or aboard ships.

In most applications, it is desirable to maximize vehicle stability and traction while minimizing the vehicle "footprint", i.e. length times width. By this metric, 3-wheel omni-vehicles perform poorly, especially if the wheels are wide. Typically, using a non-redundant omni wheel design, the contact patch or "center of pressure" (c.p.) cycles from one end of the wheel to the other. To evaluate vehicle traction, it is necessary to assume the worst-case scenario where the c.p. of each wheel is closest to the c.g. of the vehicle. If the wheels are wide, this tends to reduce the effective "wheelbase" and leads to traction problems. For most applications, a 4-wheel design will be preferable.

Figure 14:
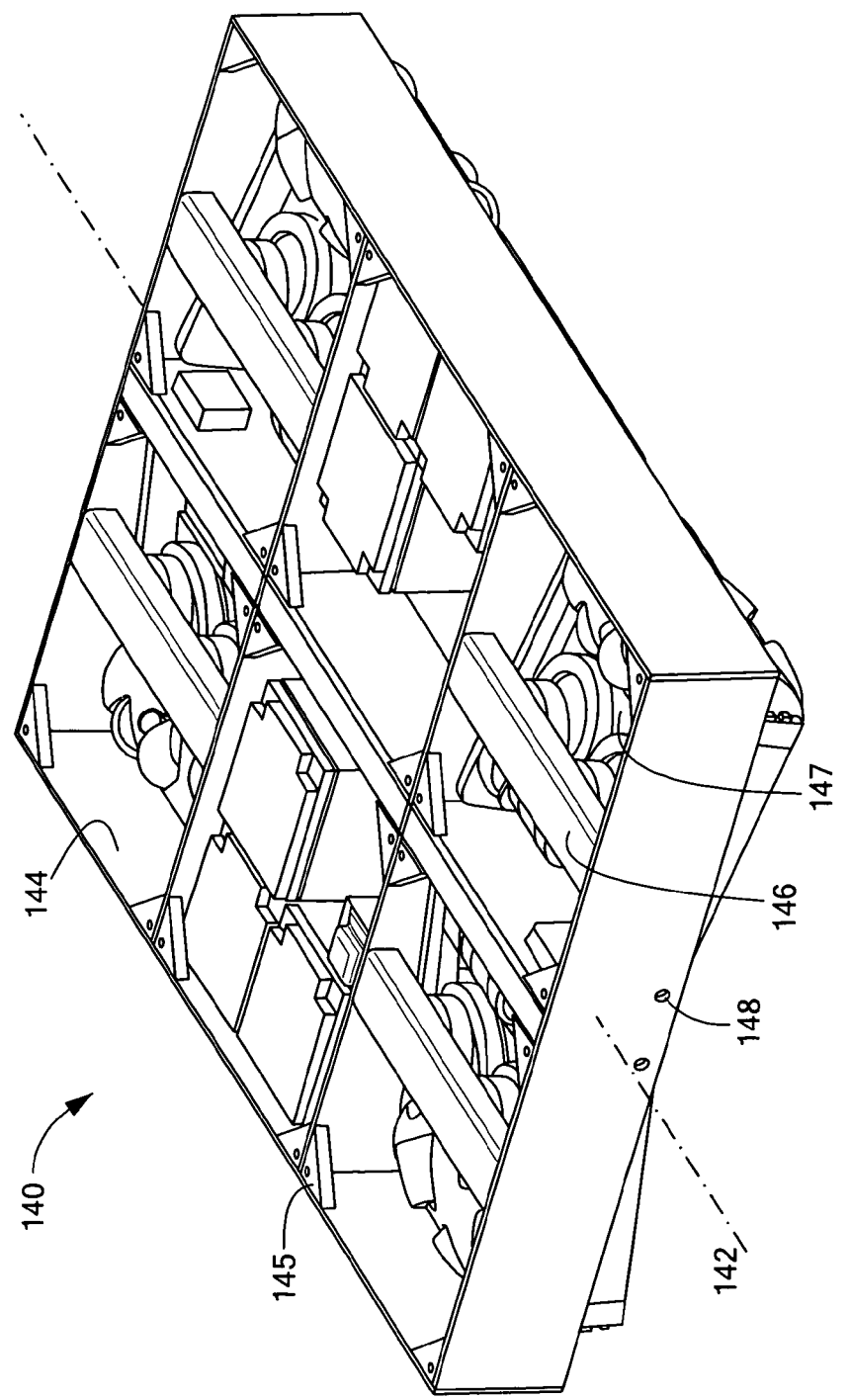
FIG. 14 is a schematic three-dimensional front view showing an example of a vehicle with omni-directional wheels mounted thereto in accordance with the subject invention.
Figure 15:
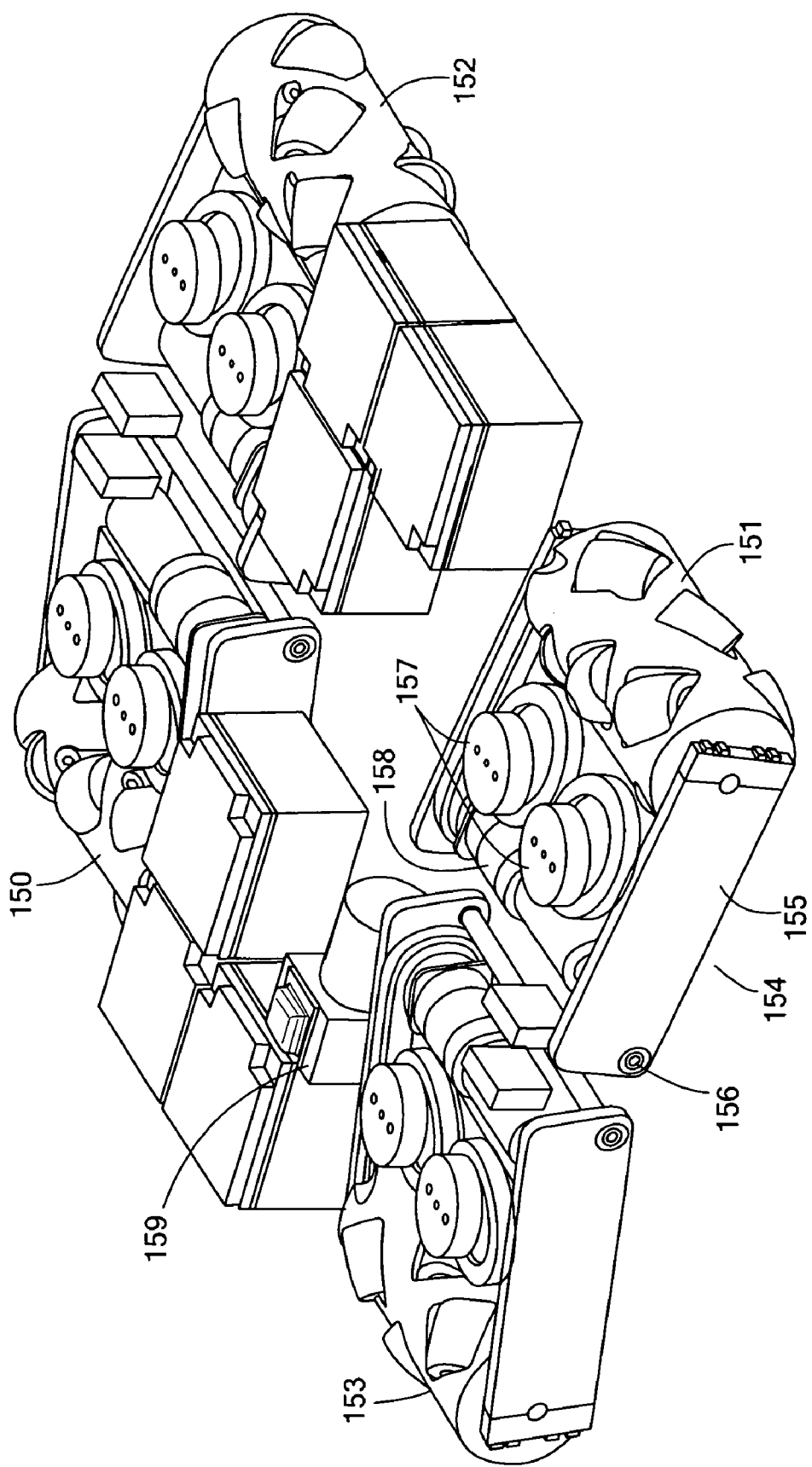
FIG. 15 shows the vehicle of FIG. 14 without the chassis.

Most 4-wheel vehicles, whether omni-directional or not, have their wheels oriented such that their axles are orthogonal to the long axis of the vehicle. Using low-profile omni-wheels in accordance with the subject invention, the opposite orientation provides better stability and traction, especially when the wheel width exceeds the wheel diameter. FIG. 14 shows 4-wheel low-profile omni-vehicle 140 using one preferred wheel layout. The top plate of the vehicle has been removed to better show the vehicle components. Normally, the top plate would mount to gussets 145 of chassis 144. FIG. 15 is the same view as FIG. 14 except that chassis 144 has been hidden. Omni-wheels 152 and 153 are identical to 100, FIG. 10. These wheels are left-handed and are diagonally opposed from each other. Omni-wheels 150 and 151 are right-handed. All four wheels are mounted with their wheel axes within 15° of the long axis 142 of the vehicle. Preferably, all four wheels are mounted with their wheel axes parallel to the long axis 142 of the vehicle, thus maximizing the worst-case (minimum) distance between the c.p.'s of the four wheels.

FIGS. 14 and 15 also show an active suspension system allowing vertical motion of each wheel while keeping the wheel axes substantially parallel to the ground. As shown there are four suspension/drive units. Two (on the diagonal) are identical and the other two are mirror images. Suspension/drive unit 154 includes omni-wheel 151 rotatably mounted to swing arm 155 which is anchored to suspension pivot 148 using suspension axle 156. Air springs 157 press upward on crossbar 146 of vehicle chassis 144, and press downward on suspension tube 147. Gearmotor 158 drives wheel 151, e.g. using a chain or belt.

Figure 16:
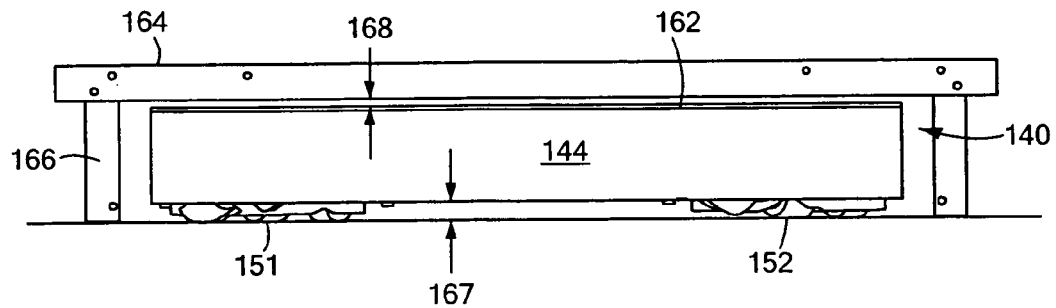
FIG. 16 shows a side view of the vehicle of FIG. 14 preparing to lift a legged pallet.
Figure 17:
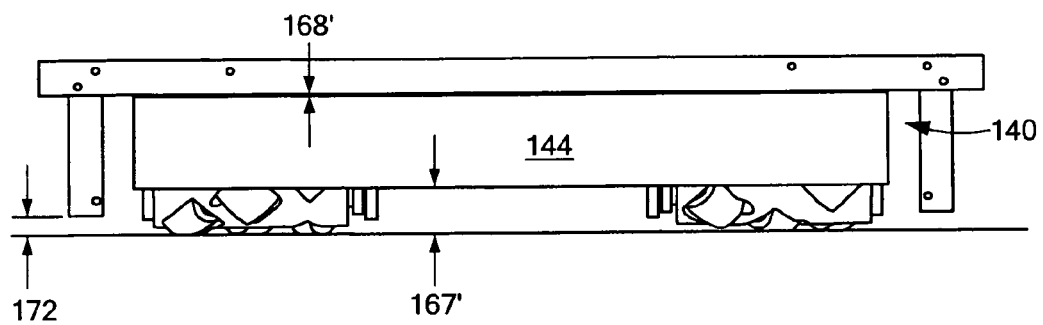
FIG. 17 shows a side view of the vehicle of FIG. 14 transporting the pallet.

Using compressor 159 and additional tanks and valving (not shown), the air pressure to the four suspension units can be controlled. At low pressure, the air-springs compress, which reduces vehicle height. As shown in FIG. 16, this enables the vehicle 140 to drive under pallet 164 supported on legs 166. Note the low ground clearance 167 and height clearance 168 between the vehicle and the pallet. Increasing the air pressure in the air-springs raises the vehicle chassis 144, FIG. 17, as shown at 172, closing the gap 168' and lifting the pallet 164. Ground clearance 167' is also increased, which improves the ability to negotiate steps ramps and obstacles.

An active suspension can also be used to provide pitch and roll motion of the chassis with respect to the ground. This feature would be useful, for instance, in aligning and mating parts or for aiming a camera or antenna. To roll the chassis to the right, i.e. to rotate clockwise about vehicle axis 142, FIG. 14, the air springs associated with omni-wheels 150 and 153, FIG. 15. would be inflated, and the air springs associated with wheels 151 and 152 would be deflated. To pitch the vehicle, the air springs associated with wheels 151 and 153 would be inflated, and those associated with wheels 150 and 152 deflated, or visa versa.

An active suspension would also improve the ability to negotiate obstacles such as cables or steps. This feature is especially beneficial for a low-profile vehicle since small diameter wheels typically have poor step-climbing performance. An example step climbing procedure would be as follows: Referring to FIGS. 14 and 15, vehicle 140 would approach the step at an angle with wheel 151 leading. The load on this wheel and the diagonally opposing wheel 150 would be reduced by releasing air from the air springs associated with one or both of these two wheels, or by adding air to the air springs associated with the other two wheels (152 or 153). The result is that most of the vehicle weight would be borne by wheels 152 and 153, and wheel 151 would easily surmount the step. Preferably, the next wheel to meet the step would be wheel 152, followed by 153 and 150. For each wheel/step climb, the load on the wheel would be reduced as was done with wheel 151.

The preferred wheel layout for an omni-vehicle, in accordance with the invention, depends on the roller angle, and visa versa. When the wheel axes are parallel to each other as in FIG. 1 (prior art) and in FIG. 14-17, the preferred roller angle is close to 45°, e.g. between 35° and 55°, the reason being that each wheel provides significant traction only in the direction of the axis of the roller in contact with the ground, as viewed from above. If the roller angle is reduced, e.g. to improve load capacity, the traction vectors of adjacent wheels are no longer orthogonal and the vehicle will tend to have reduced traction in the direction orthogonal to the wheel axes.

Figure 18:
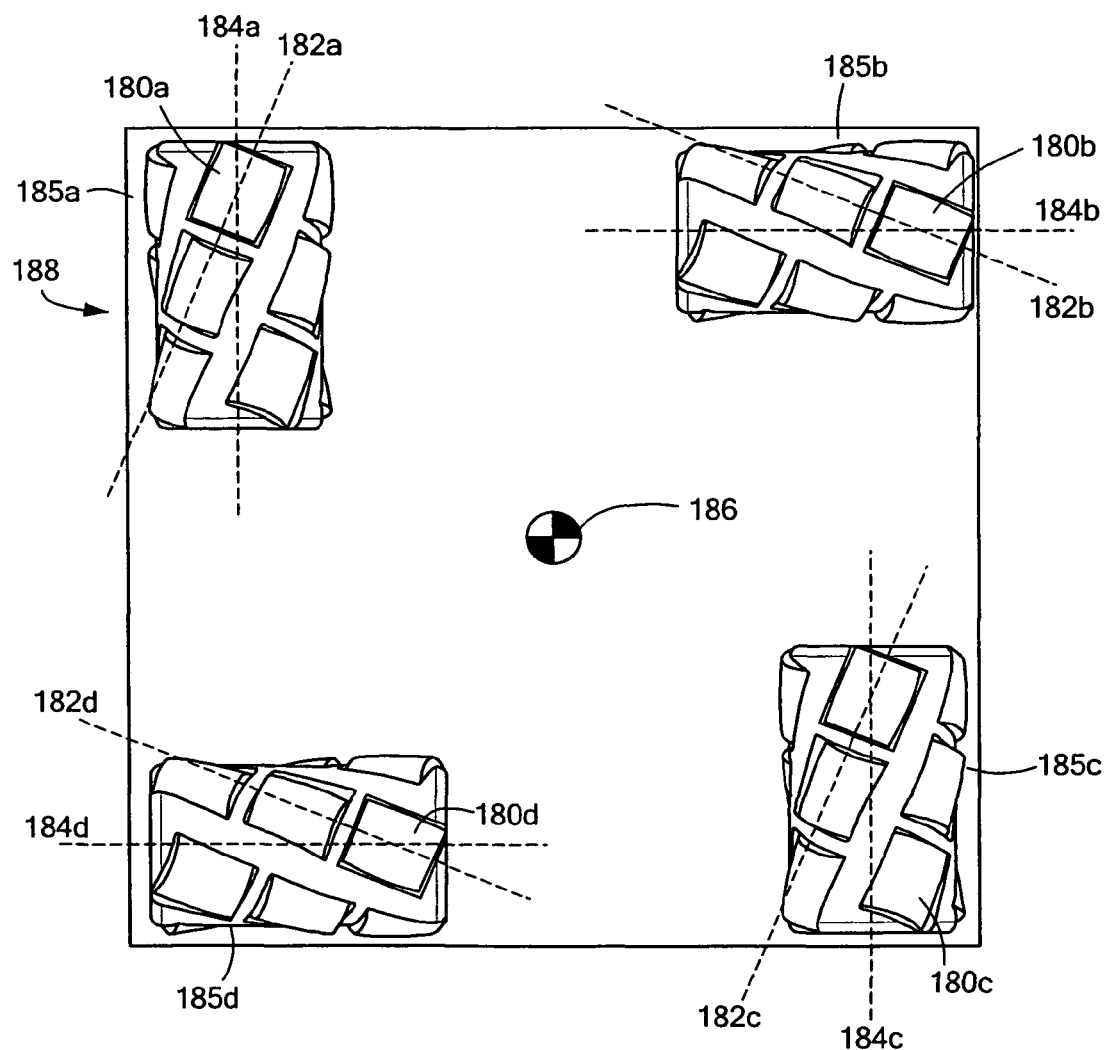
FIG. 18 shows a bottom view of a vehicle having an alternate wheel layout appropriate when using omni-directional wheels with reduced roller angle.

This problem can be mitigated by changing the wheel orientations such that the roller axes are close to orthogonal. FIG. 18 shows an especially advantageous wheel layout for a vehicle using omni-wheels with reduced roller angle. In this bottom view of vehicle 188, there are four omni-wheels 185a-d, each wheel having 3 rows of 4 rollers with roller angle 22.5°. Rollers 180a-d are in contact with the ground. All four wheels have the same "handedness", in this case left-handed. The wheel axes of diagonal opposing wheels are parallel, and the wheel axes of adjacent wheels are perpendicular. For instance, wheel axes 184a and 184c of wheels 185a and 185c are parallel, and wheel axes 184b and 184d of wheels 185b and 185d are parallel and perpendicular to wheel axes 184a and 184c. Note that the roller axes of adjacent wheels are also perpendicular. For example, roller axis 182b is perpendicular to roller axis 182c and roller axis 182a is perpendicular to roller axis 182d. Roller axes 182a and 182c of wheels 185a and 185c are parallel and roller axes 182b and 182d of wheels 185b and 185d are parallel.

For maximum control of vehicle yaw, the handedness of the wheels should be chosen to maximize the distance between the roller axes and the vehicle center of gravity 186. As shown in FIG. 18, left-handed wheels are preferred. If the wheels on the left were swapped with those on the right (without mirroring or rotating them), yaw traction would be reduced, however, this could be corrected by using right-handed wheels.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An omni-directional wheel comprising:
    a hub rotatable about a wheel axis;
    a first row of angled rollers about the hub each rotatably supported by the hub; and
    at least a second row of angled rollers about the hub each rotatably supported by the hub, the second row of rollers axially offset along the wheel axis from the first row and rotationally offset from the first row about the wheel axis, wherein the rollers of the second row are not coaxial with the rollers of the first row.

2. The omni-directional wheel of claim 1, wherein the rotational offset between rows of angled rollers is defined by the quotient 360/(n×r) degrees, where n is the total number of angled rollers per row and r is the total number of rows of angled rollers.

3. The omni-directional wheel of claim 2, wherein the rollers of any one row do not form a substantially complete circle when viewed along the wheel axis, but the rollers of additional rows fill in the angular gaps between rollers resulting in a substantially round wheel.

4. The omni-directional wheel of claim 2, wherein n is between 3 and 7.

5. The omni-directional wheel of claim 2, wherein r is greater than 2.

6. The omni-directional wheel of claim 1, wherein the angled rollers all have a common roller angle, wherein the common roller angle is defined as the angle between a plane perpendicular to an axis of the respective roller and a plane perpendicular to the wheel axis.

7. The omni-directional wheel of claim 6, wherein the roller angle is between 35° and 55°.

8. The omni-directional wheel of claim 6, wherein the roller angle is less than 35°.

9. The omni-directional wheel of claim 1, wherein each roller is supported on both its ends by the hub.

10. The omni-directional wheel of claim 9, wherein there are two rows of rollers and the hub includes a center rim sandwiched by and attached to an inner flange and an outer flange, wherein the rollers of the first row are mounted between the center rim and the inner flange, and the rollers of the second row are mounted between the center rim and the outer flange.

11. The omni-directional wheel of claim 1, wherein each roller is supported on only one end by the hub.

12. The omni-directional wheel of claim 11, wherein there are two rows of rollers and the hub includes a zig-zag center rib and the rollers of one row are disposed on one side of the zig-zag center rib and the rollers of the other row are disposed on the other side of the zig-zag center rib.

13. The omni-directional wheel of claim 1, wherein the rollers of one of the rows are nested with the rollers of an adjacent row such that the rollers of both rows intersect a common plane orthogonal to the wheel axis.

14. The omni-directional wheel of claim 1, further comprising redundant rows of rollers to provide a minimum of two rollers for contact with a flat surface parallel to the wheel axis.

15. The omni-directional wheel of claim 1, wherein the ends of each roller all have a substantially equal diameter.

16. An omni-directional vehicle having at least three omni-directional wheels each comprising:
    a hub rotatable about a wheel axis;
    a first row of angled rollers about the hub each rotatably supported by the hub; and
    at least a second row of angled rollers about the hub each rotatably supported by the hub, the second row of rollers axially offset along the wheel axis from the first row and rotationally offset from the first row about the wheel axis,
    wherein the rollers of the second row are not coaxial with the rollers of the first row, and the rollers of both rows have a substantially common roller angle, wherein the roller angle is defined as the angle between a plane perpendicular to an axis of the respective roller and a plane perpendicular to the wheel axis.

17. The omni-directional vehicle of claim 16, wherein the omni-directional vehicle has four of said omni-directional wheels.

18. The omni-directional vehicle of claim 17 wherein:
    the vehicle is elongated and has a long axis; and
    the wheels are oriented with their axes aligned within 15° of the long axis of the vehicle.

19. The omni-directional vehicle of claim 18, wherein the diameter of each wheel is smaller than the width of said wheel.

20. The omni-directional vehicle of claim 17, further including a chassis and a suspension system allowing independent vertical motion of each of the omni-directional wheels with respect to the chassis while keeping the wheel axes of the wheels approximately parallel to the driving surface.

21. The omni-directional vehicle of claim 20, wherein the suspension system is actively controlled and can raise or lower the chassis.

22. The omni-directional vehicle of claim 21, wherein the load can be reduced on one diagonally opposed pair of the omni-directional wheels while increasing the load on the other diagonally opposed pair of diagonally opposed the omni-directional wheels.

23. The omni-directional vehicle of claim 22, wherein the suspension system actively controls the pitch or roll angle of the chassis relative to the driving surface.

24. The omni-directional vehicle of claim 17, wherein the roller angle of each wheel is between 35° and 55°, one diagonally opposed pair of the omni-directional wheels are right-handed, and the other diagonally opposed pair of the omni-directional wheels are left-handed.

25. The omni-directional vehicle of claim 17, wherein the roller angle of each wheel is less than 40°, all four wheels have the same handedness, the wheel axes of diagonal opposing ones of the omni-directional wheels are within 15° of parallel, and the wheel axes of adjacent ones of the omni-directional wheels are within 15° of perpendicular.

* * * * *